(12) United States Patent
Okamoto et al.

(10) Patent No.: US 9,153,382 B2
(45) Date of Patent: Oct. 6, 2015

(54) MULTILAYER CERAMIC CAPACITOR AND METHOD FOR MANUFACTURING MULTILAYER CERAMIC CAPACITOR

(71) Applicant: Murata Manufacturing Co., Ltd., Nagaokakyo-shi, Kyoto-fu (JP)

(72) Inventors: Takafumi Okamoto, Nagaokakyo (JP); Noriyuki Inoue, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 177 days.

(21) Appl. No.: 13/936,410

(22) Filed: Jul. 8, 2013

(65) Prior Publication Data

US 2013/0294007 A1    Nov. 7, 2013

Related U.S. Application Data

(63) Continuation of application No. PCT/JP2012/050138, filed on Jan. 6, 2012.

(30) Foreign Application Priority Data

Jan. 12, 2011    (JP) .................................. 2011-003938

(51) Int. Cl.
*H01G 4/06* (2006.01)
*C04B 35/00* (2006.01)
(Continued)

(52) U.S. Cl.
CPC ............ *H01G 4/1209* (2013.01); *C01G 23/006* (2013.01); *C01G 25/006* (2013.01); *C04B 35/4682* (2013.01); *C04B 35/49* (2013.01); *H01B 3/12* (2013.01); *H01G 4/1227* (2013.01); *H01G 4/30* (2013.01); *C01P 2002/34* (2013.01); *C01P 2002/50* (2013.01); *C01P 2006/40* (2013.01); *C04B 2235/3206* (2013.01); *C04B 2235/3208* (2013.01); *C04B 2235/3213* (2013.01); *C04B 2235/3215* (2013.01);
(Continued)

(58) Field of Classification Search
USPC .................... 361/321.1–321.5; 501/135–137; 29/25.42
See application file for complete search history.

(56) References Cited

U.S. PATENT DOCUMENTS 7,271,115 B2 * 9/2007 Suzuki .......................... 501/138
8,400,755 B2 * 3/2013 Ikeda et al. ................ 361/321.4
(Continued)

FOREIGN PATENT DOCUMENTS

EP          1391441 A2 *  2/2004
JP          63-103861 A     5/1988
(Continued)

OTHER PUBLICATIONS

Official Communication issued in International Patent Application No. PCT/JP2012/050138, mailed on Apr. 24, 2012.

*Primary Examiner* — Eric Thomas
(74) *Attorney, Agent, or Firm* — Keating & Bennett, LLP

(57) ABSTRACT

A multilayer ceramic capacitor exhibits superior life characteristics in a high temperature load test despite the use of very thin dielectric layers. As a dielectric ceramic constituting a dielectric layer of the multilayer ceramic capacitor, a perovskite-type compound is used and contains Ba and Ti (a portion of Ba can be replaced with at least one of Ca and Sr, and a portion of Ti can be replaced with Zr) as a main component, and including La within the range of 2-6 parts by mole, Mg within the range of 3-5 parts by mole, and Mn within the range of 1.5-3 parts by mole in a case where a total content of Ti and Zr is 100 parts by mole.

17 Claims, 1 Drawing Sheet

(51) Int. Cl.
*H01G 4/12* (2006.01)
*C01G 23/00* (2006.01)
*C01G 25/00* (2006.01)
*C04B 35/468* (2006.01)
*C04B 35/49* (2006.01)
*H01B 3/12* (2006.01)
*H01G 4/30* (2006.01)

(52) U.S. Cl.
CPC . *C04B2235/3224* (2013.01); *C04B 2235/3225* (2013.01); *C04B 2235/3227* (2013.01); *C04B 2235/3229* (2013.01); *C04B 2235/3262* (2013.01); *C04B 2235/3418* (2013.01); *C04B 2235/652* (2013.01); *C04B 2235/6582* (2013.01); *C04B 2235/6584* (2013.01); *C04B 2235/6588* (2013.01)

(56) References Cited

U.S. PATENT DOCUMENTS

| | | | |
|---|---|---|---|
| 2006/0264317 | A1 | 11/2006 | Banno |
| 2007/0123413 | A1 | 5/2007 | Suzuki |
| 2009/0244805 | A1* | 10/2009 | Banno et al. ............... 361/301.4 |
| 2010/0029464 | A1* | 2/2010 | Shibasaki et al. ............. 501/139 |
| 2011/0170228 | A1 | 7/2011 | Ikeda et al. |
| 2011/0195178 | A1* | 8/2011 | Kojima et al. ............ 427/126.3 |

FOREIGN PATENT DOCUMENTS

| | | |
|---|---|---|
| JP | 04-169003 A | 6/1992 |
| JP | 2007-234677 A | 9/2007 |
| WO | 2005/082807 A1 | 9/2005 |
| WO | 2006/006333 A1 | 1/2006 |
| WO | 2010/035663 A1 | 4/2010 |

\* cited by examiner

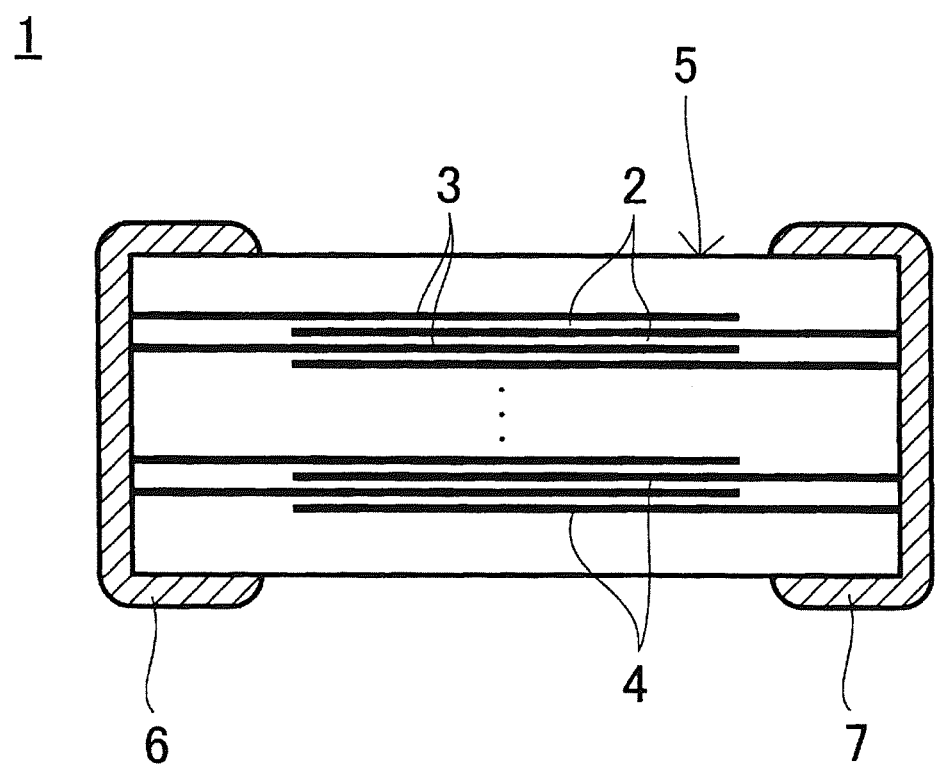

MULTILAYER CERAMIC CAPACITOR AND METHOD FOR MANUFACTURING MULTILAYER CERAMIC CAPACITOR

BACKGROUND OF THE INVENTION

1. Field of the Invention

The present invention relates to a multilayer ceramic capacitor. Further, the present invention relates to a method for manufacturing a multilayer ceramic capacitor.

2. Description of the Related Art

A multilayer ceramic capacitor as a typical ceramic electronic component generally includes a multilayer body having a plurality of laminated dielectric layers and a plurality of internal electrodes arranged along interfaces between the dielectric layers and a plurality of external electrodes formed on an outer surface of the multilayer body and electrically connected to the internal electrodes.

With the progress of electronics technology in recent years, miniaturization and capacity enlargement in a multilayer ceramic capacitor are required. To meet these requirements, thinning of a dielectric layer in a multilayer ceramic capacitor has been promoted. However, thinning of a dielectric layer causes a field intensity applied to each layer to be relatively high. Therefore, improvement in reliability during voltage application and particularly in life characteristics presented by a high temperature load test is required with respect to a dielectric ceramic included in a dielectric layer.

An example of a dielectric ceramic constituting a dielectric layer is known from the disclosure of Japanese Patent Publication No. 4-169003. Japanese Patent Publication No. 4-169003 discloses a dielectric ceramic. The dielectric ceramic contains 100 parts of main components including 95.0-98.0 molar % of $BaTiO_3$ having an unreacted BaO content of less than or equal to 0.7 weight % and a Ba/Ti molar ratio of 1.005-1.025, and 2.0-5.0 molar % of rare-earth oxide of at least one type selected from the group consisting of La, Nd, Sm, Dy and Er. The dielectric ceramic contains subcomponents including 0.3-1.5 parts by weight of MnO and 0.5-2.5 parts by weight of oxide glass having $BaO$—$SrO$—$Li_2O$—$SiO_2$ as a main component, with respect to the main components.

Japanese Patent Publication No. 4-169003 does not describe the case where the dielectric layers are formed to be thinner. Therefore, when the dielectric ceramic disclosed in Japanese Patent Publication No. 4-169003 is employed as a dielectric layer for a multilayer ceramic capacitor exhibiting the progress of thinning, high reliability during voltage application is not assured.

SUMMARY OF THE INVENTION

In view of the problems described above, preferred embodiments of the present invention provide a multilayer ceramic capacitor that achieves favorable dielectric characteristics even with thinning of a dielectric layer and application of a voltage having a high field intensity, and exhibiting superior life characteristics during a high temperature load test.

A multilayer ceramic capacitor according to a preferred embodiment of the present invention includes a multilayer body including a plurality of laminated dielectric layers and a plurality of internal electrodes arranged along interfaces between the dielectric layers, and a plurality of external electrodes located on an outer surface of the multilayer body and electrically connected to the internal electrodes. A composition of the multilayer body includes, as a main component, a perovskite-type compound containing Ba and Ti (a portion of Ba can be replaced with at least one of Ca and Sr, and a portion of Ti can be replaced with Zr) and further includes La, Mg, and Mn. When the multilayer body is dissolved by a solvent, and in a case where a total content of Ti and Zr is 100 parts by mole, the content of the elements are: La: 2-6 parts by mole; Mg:3-5 parts by mole; and Mn:1.5-3 parts by mole.

Further, a multilayer ceramic capacitor according to a preferred embodiment of the present invention includes a multilayer body including a plurality of laminated dielectric layers and a plurality of internal electrodes arranged along interfaces between the dielectric layers, and a plurality of external electrodes arranged on an outer surface of the multilayer body and electrically connected to the internal electrodes. A composition of the dielectric layers includes, as a main component, a perovskite-type compound containing Ba and Ti (a portion of Ba can be replaced with at least one of Ca and Sr, and a portion of Ti can be replaced with Zr), and further includes La, Mg, and Mn. In a case where a total content of Ti and Zr is 100 parts by mole, the content of the elements are: La: 2-6 parts by mole; Mg: 3-5 parts by mole; and Mn: 1.5-3 parts by mole.

Further, a method for manufacturing a dielectric multilayer ceramic capacitor according to a preferred embodiment of the present invention includes the steps of preparing main component powder including, as a main component, a perovskite-type compound containing Ba and Ti (a portion of Ba can be replaced with at least one of Ca and Sr, and a portion of Ti can be replaced with Zr); preparing an La compound, an Mg compound, and an Mn compound; obtaining ceramic slurry after mixing the main component powder, the La compound, the Mg compound, and the Mn compound; obtaining a ceramic green sheet from the ceramic slurry; obtaining an unfired multilayer body by laminating the ceramic green sheet and internal electrode layers; and obtaining the multilayer body having internal electrodes formed between dielectric layers by firing the unfired multilayer body. In a case where a total content of Ti and Zr is 100 parts by mole, the content of elements are: La: 2-6 parts by mole; Mg: 3-5 parts by mole; and Mn: 1.5-3 parts by mole.

In the multilayer ceramic capacitor or the method for manufacturing a multilayer ceramic capacitor according to a preferred embodiment of the present invention, in a case where a total content of Ti and Zr is 100 parts by mole, the content of La is preferably 4-6 parts by mole.

Further, in a case where a content of La is 100 parts by mole, a total content of Ce, Pr, and Nd is preferably less than or equal to 20 parts by mole (including 0 part by mole).

Further, in a case where a content of La is 100 parts by mole, a total content of Sm, Eu, Gd, Tb, Dy, Y, Ho, and Er is preferably less than or equal to 10 parts by mole (including 0 part by mole).

Further, in a case where a content of La is 100 parts by mole, a total content of Tm, Yb, and Lu is preferably less than or equal to 5 parts by mole (including 0 part by mole).

According to the dielectric ceramic of various preferred embodiments of the present invention, the composition described above provides a multilayer ceramic capacitor that achieves favorable dielectric characteristics even with thinning of a dielectric layer and application of a voltage having a high field intensity, and exhibiting superior life characteristics during a high temperature load test.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1 is a cross sectional view of a multilayer ceramic capacitor according to a preferred embodiment of the present invention.

DETAILED DESCRIPTION OF THE PREFERRED EMBODIMENTS

Hereinafter, preferred embodiments of the present invention will be described.

FIG. 1 is a cross sectional view of a multilayer ceramic capacitor according to a preferred embodiment of the present invention.

A multilayer ceramic capacitor 1 includes a multilayer body 5. Multilayer body 5 includes a plurality of laminated dielectric layers 2, and a plurality of internal electrodes 3 and 4 arranged along interfaces between the plurality of laminated dielectric layers 2. Internal electrodes 3 and 4 may be of material containing, for example, Ni as a main component.

At different positions on an outer surface of multilayer body 5, external electrodes 6 and 7 are provided. External electrodes 6 and 7 may be of material containing, for example, Ag and Cu as main components. In the multilayer ceramic capacitor shown in FIG. 1, external electrodes 6 and 7 are provided on opposite end surfaces of multilayer body 5. Internal electrodes 3 and 4 are electrically connected to external electrodes 6 and 7, respectively. Internal electrodes 3 and 4 are laminated alternately through dielectric layers 2 in multilayer body 5.

The multilayer ceramic capacitor 1 may be of a two-terminal type having two external electrodes 6 and 7 or may be of a multi-terminal type having a plurality of external electrodes.

Dielectric layer 2 is constituted by a dielectric ceramic including, as a main component, a perovskite-type compound containing Ba and Ti (a portion of Ba can be replaced with at least one of Ca and Sr, and a portion of Ti can be replaced with Zr), and containing La of 2-6 parts by mole, Mg of 3-5 parts by mole, and Mn of 1.5-3 parts by mole in a case where a total content of Ti and Zr is 100 parts by mole. As described above, when La, Mg, and Mn are contained together within the range of predetermined amounts with respect to the main component, a multilayer ceramic capacitor exhibiting superior life characteristics during a high temperature load test can be obtained.

In a case where a total content of Ti and Zr is 100 parts by mole, La is preferably contained within the range of 4-6 parts by mole. In this case, a multilayer ceramic capacitor exhibiting better life characteristics during a high temperature load test can be obtained.

Further, in a case where a content of La is 100 parts by mole, a total content of Ce, Pr, and Nd is preferably less than or equal to 20 parts by mole (including 0 part by mole). Further, in a case where a content of La is 100 parts by mole, a total content of Sm, Eu, Gd, Tb, Dy, Y, Ho, and Er is preferably less than or equal to 10 parts by mole (including 0 part by mole). Further, in a case where a content of La is 100 parts by mole, a total content of Tm, Yb, and Lu is preferably less than or equal to 5 parts by mole (including 0 part by mole). Also in these cases, a multilayer ceramic capacitor exhibiting superior life characteristics during a high temperature load test can be obtained.

A molar ratio of the sum of Ba, Ca, and Sr with respect to the sum of Ti and Zr is set appropriately, and preferably selected within the range of about 0.98 to about 1.05, for example.

Raw material powder of a dielectric ceramic is produced by, for example, solid phase synthesis. In particular, compound powders of oxide, carbonate, chloride, organic metal compound and the like containing constituent elements of the main components are mixed firstly with a predetermined ratio and calcinated. Methods other than the solid phase synthesis may be applied. For example, a coprecipitation method, a hydrothermal synthesis method, an oxalic acid method, and the like may be applied.

The multilayer ceramic capacitor is produced, for example, in a manner described below. The raw material powder of a dielectric ceramic obtained as described above is used to produce ceramic slurry. Then, a ceramic green sheet is formed by a sheet forming method and the like. Then, conductive paste constituting an internal electrode is applied by printing and the like onto a predetermined ceramic green sheet among a plurality of ceramic green sheets. Then, the plurality of ceramic green sheets are laminated and then adhered with pressure to obtain a raw multilayer body. Then, the raw multilayer body is fired. In this step of firing, raw material powder of a dielectric ceramic is fired to obtain a dielectric layer constituted by a dielectric ceramic is obtained. Thereafter, external electrodes are formed on end surfaces of the multilayer body by firing and the like.

Next, non-limiting experimental examples based on preferred embodiments of the present invention will be described.

EXPERIMENTAL EXAMPLE 1

In experimental example 1, a multilayer ceramic capacitor was produced by using a dielectric ceramic containing barium titanate as a main component and having contents of La, Mg, and Mn changed with respect to the main component, and a high temperature load life characteristic experiment was conducted.

(A) Production of Raw Material Powder for Dielectric Ceramic

As starting material for a main component, powders of $BaCO_3$ and $TiO_2$ were prepared. Then, the powders were weighed so that the molar ratio of Ba with respect to Ti becomes 1.01, and mixed for a predetermined time period by a ball mill with water as an agent. Thereafter, the mixture was calcinated at 1000° C. and then pulverized to obtain ceramic powder of the main component.

Next, as starting material for subcomponents, powders of $La_2O_3$, $MgCO_3$, $MnCO_3$, and $SiO_2$ were obtained. Then, these powders were weighed so that "a" parts by mole of an La content, "b" parts by mole of an Mg content, "c" parts by mole of an Mn content, and 1.5 parts by mole of an Si content were obtained with respect to 100 parts by mole of Ti. Then, the powders were blended with the ceramic powder of the main component, and mixed in water by a ball mill. Thereafter, evaporating and drying were applied to obtain raw material powder of a dielectric ceramic having contents of La, Mg and Mn changed with respect to the main component. Table 1 shows values a, b, and c of the samples under each of experimental conditions.

The ICP emission spectroscopic analysis was conducted with respect to the obtained raw material powder. The result confirmed that the mixture composition was substantially the same as the mixture composition shown in Table 1.

(B) Production of Multilayer Ceramic Capacitor

Firstly, a ceramic green sheet constituting a dielectric layer was formed. In particular, polyvinyl butyral based binder and ethanol were added to the raw material powder, and wet-blending was performed by a ball mill. Then, slurry was shaped to have a sheet-like shape by a doctor blade method to obtain a ceramic green sheet.

Next, a raw multilayer body was formed. In particular, conductive paste containing Ni as a main component was screen-printed onto a certain ceramic green sheet to form a conductive paste film constituting an internal electrode. A plurality of ceramic green sheets having the conductive paste films formed thereon were laminated so as to provide drawn-out sides of conductive paste films alternately, and then adhered by pressure, so that a raw multilayer body was obtained.

Next, the raw multilayer body was fired. In particular, firstly, the raw multilayer body was heated to a temperature of 300° C. under a reductive atmosphere to burn a binder. Thereafter, under a reductive atmosphere of $H_2$-$N_2$-$H_2O$ gas with an oxygen partial pressure of $10^{10}$ MPa, firing was conducted for 3 hours at a temperature of 1250° C.

The fired multilayer body was dissolved by a solvent, and the ICP emission spectroscopic analysis was conducted. The result confirmed that the mixture composition was substantially the same as the mixture composition shown in Table 1, except for Ni as an internal electrode component.

Next, the external electrodes were formed. In particular, Cu paste containing $B_2O_3$—$Li_2O$—$SiO_2$-BaO based glass frit was applied to both end surfaces of the multilayer body. Thereafter, heating was conducted at a temperature of 800° C. in a nitrogen atmosphere to fire Cu paste.

External dimensions of the multilayer ceramic capacitor produced as described above had a length of about 1.6 mm, a width of about 3.2 mm, and a thickness of about 0.7 mm, for example. The number of effective dielectric layers was 100. A facing area of the internal electrodes for each dielectric layer was about 2.5 $mm^2$, for example A thickness of dielectric layers provided between internal electrodes was about 3.0 μm, and a thickness of internal electrodes was about 0.8 μm, for example.

(C) High Temperature Load Life Test

The high temperature load life test was conducted for the obtained multilayer ceramic capacitor.

Firstly, a voltage of 90V was applied at a temperature of 150° C. with respect to multilayer ceramic capacitors according to samples, and then changes in insulating resistance with time were measured. Then, the high temperature load life test was conducted with respect to 100 samples. The samples exhibited an insulating resistance value of less than or equal to 10 kΩ was determined as a failure, and a mean time to failure (MTTF) of 50% was calculated in accordance with the Weibull analysis of a time to failure. Herein, MTTF greater than or equal to 500 hours was taken as a favorable condition.

Table 1 shows results of MTTF in the high temperature load life test for each sample under each experiment condition. In Table 1, the samples identified with * next to the sample number are test samples outside the scope of the present invention.

TABLE 1

| Sample Number | La (a) | Mg (b) | Mn (c) | High Temperature Load Test MTTF (Time) |
|---|---|---|---|---|
| *1 | 1.0 | 3.0 | 2.0 | 130 |
| 2 | 2.0 | 3.0 | 2.0 | 950 |
| 3 | 4.0 | 3.5 | 2.0 | 1350 |
| 4 | 6.0 | 3.5 | 3.0 | 1900 |
| *5 | 8.0 | 3.5 | 3.0 | 250 |
| *6 | 5.0 | 2.0 | 1.5 | 30 |
| 7 | 5.0 | 3.0 | 1.5 | 1750 |
| 8 | 5.0 | 4.0 | 1.5 | 1320 |
| 9 | 5.0 | 5.0 | 1.5 | 1220 |
| *10 | 5.0 | 6.0 | 1.5 | 480 |
| *11 | 3.0 | 3.0 | 0.5 | 450 |
| 12 | 3.0 | 3.0 | 1.5 | 880 |
| 13 | 3.0 | 3.0 | 2.5 | 980 |
| *14 | 3.0 | 3.0 | 3.5 | 390 |

Sample No. 1 had an La content of 1.0 parts by mole with respect to 100 parts by mole of Ti, and the result showed that MTTF was small. Further, Sample No. 5 had an La content of 8.0 parts by mole, and the result shows that MTTF was small.

Sample No. 6 had an Mg content of 2.0 parts by mole, and the result shows that MTTF was small. Further, Sample No. 10 had an Mg content of 6.0 parts by mole, and the result shows that MTTF was small.

Sample No. 11 had an Mn content of 0.5 parts by mole, and the result shows that MTTF was small. Further, Sample No. 14 had an Mn content of 3.5 parts by mole, and the result shows that MTTF was small.

On the other hand, Sample Nos. 2-4, 7-9, 12, and 13 had an La content within the range of 2-6 parts by mole, an Mg content within the range of 3-5 parts by mole, and an Mn content within the range of 1.5-3 parts by mole, and exhibited favorable life characteristics with MTTF greater than or equal to 880 hours. Particularly, for Sample Nos. 3 and 4 had an La content of 4-6 parts by mole, and exhibited favorable life characteristics with MTTF greater than or equal to 1350 hours.

EXPERIMENTAL EXAMPLE 2

In Experimental Example 2, a multilayer ceramic capacitor was produced by using a dielectric ceramic having a changed La content and a changed molar ratio of Re (Ce, Pr, Nd, Sm, Eu, Gd, Tb, Dy, Y, Ho, Er, Tm, Yb, Lu) element with respect to La.

(A) Production of Raw Material Powder for Dielectric Ceramic

Firstly, ceramic powder of a main component was obtained in a manner similar to that of Experimental Example 1. Next, as starting material for subcomponents, powders of $Ce_2O_3$, $Pr_2O_3$, $Nd_2O_3$, $Sm_2O_3$, $Eu_2O_3$, $Gd_2O_3$, $Tb_2O_3$, $Dy_2O_3$, $Y_2O_3$, $Ho_2O_3$, $Er_2O_3$, $Tm_2O_3$, $Yb_2O_3$ and $Lu_2O_3$ were prepared in addition to the powders shown in Experimental Example 1, and these powders were weighed so that "$a_1$" parts by mole of an La content, "$a_2$" parts by mole of an Re content, 3 parts by mole of an Mg content, 2 parts by mole of an Mn content, and 1.5 parts by mole of an Si content were obtained with respect to 100 parts by mole of Ti in ceramic powder of the main component. Then, the mixture was blended with the ceramic powder of the main component to obtain raw material powder of a dielectric ceramic. Table 2 shows $a_1$, $a_2$ values for samples under each experimental condition.

The ICP emission spectroscopic analysis was conducted with respect to the obtained raw material powder. The result confirmed that the mixture composition was substantially the same as the mixture composition shown in Table 2.

(B) Production of Multilayer Ceramic Capacitor

Multilayer ceramic capacitor was produced in a manner similar to Experimental Example 1 using the raw material powder of the dielectric ceramic.

The fired multilayer body was dissolved by a solvent, and the ICP emission spectroscopic analysis was conducted. The result confirmed that the mixture composition was substantially the same as the mixture composition shown in Table 2, except for Ni of an internal electrode component.

(C) High Temperature Load Life Test

The high temperature load life test was conducted for the obtained multilayer ceramic capacitor. Table 2 shows the result of MTTF in the high temperature load life test for the sample of each experimental condition.

TABLE 2

| Sample No. | La ($a_1$) | Re ($a_2$) | | | | | | | | | | | | | | Re/La Ratio | High Temperature Load Test MTTF (Time) |
|---|---|---|---|---|---|---|---|---|---|---|---|---|---|---|---|---|---|
| | | Ce | Pr | Nd | Sm | Eu | Gd | Tb | Dy | Y | Ho | Er | Tm | Yb | Lu | | |
| 21 | 2.0 | 0.2 | — | — | — | — | — | — | — | — | — | — | — | — | — | 0.10 | 800 |
| 22 | 3.0 | — | 0.6 | — | — | — | — | — | — | — | — | — | — | — | — | 0.20 | 870 |
| 23 | 5.0 | — | — | 0.5 | — | — | — | — | — | — | — | — | — | — | — | 0.10 | 1300 |
| 24 | 2.0 | 0.4 | — | — | — | — | — | — | — | — | — | — | — | — | — | 0.20 | 900 |
| 25 | 2.0 | — | — | 0.6 | — | — | — | — | — | — | — | — | — | — | — | 0.30 | 560 |
| 26 | 3.0 | — | — | — | — | — | 0.1 | — | — | — | 0.1 | — | — | — | — | 0.07 | 790 |
| 27 | 3.0 | — | — | — | — | 0.1 | — | — | 0.2 | — | — | — | — | — | — | 0.10 | 870 |
| 28 | 3.0 | — | — | — | 0.1 | — | — | — | — | — | 0.2 | — | — | — | — | 0.10 | 870 |
| 29 | 3.0 | — | — | — | — | — | — | 0.1 | — | 0.1 | — | — | — | — | — | 0.07 | 790 |
| 30 | 3.0 | — | — | — | — | — | — | — | — | — | 0.3 | — | — | — | — | 0.10 | 880 |
| 31 | 3.0 | — | — | — | — | — | — | — | 0.2 | — | 0.2 | — | — | — | — | 0.13 | 530 |
| 32 | 3.0 | — | — | — | — | — | — | — | — | — | — | — | 0.1 | — | — | 0.03 | 850 |
| 33 | 2.0 | — | — | — | — | — | — | — | — | — | — | — | — | 0.1 | — | 0.05 | 700 |
| 34 | 3.0 | — | — | — | — | — | — | — | — | — | — | — | — | — | 0.1 | 0.03 | 820 |
| 35 | 2.0 | — | — | — | — | — | — | — | — | — | — | — | — | 0.2 | — | 0.10 | 510 |

Sample Nos. 21-35 exhibited favorable life characteristics with MTTF greater than or equal to 510 hours under any conditions.

Particularly, Sample Nos. 21-24 had a molar ratio of Ce, Pr, and Nd with respect to La less than or equal to 0.2 and exhibited the MTTF greater than or equal to 800 hours. Sample Nos. 26-30 had a molar ratio of Sm, Eu, Gd, Tb, Dy, Y, Ho, Er with respect to La less than or equal to 0.1 and exhibited the MTTF greater than or equal to 790 hours. Sample Nos. 32-34 had a molar ratio of Tm, Yb, and Lu with respect to La less than or equal to 0.05 and exhibited the MTTF greater than or equal to 700 hours.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor, comprising:
   a multilayer body including a plurality of laminated dielectric layers and a plurality of internal electrodes arranged along interfaces between the dielectric layers; and
   a plurality of external electrodes located on an outer surface of the multilayer body and electrically connected to the internal electrodes; wherein
   a composition of the multilayer body includes, as a main component, a perovskite-type compound containing Ba and Ti, where a portion of Ba can be replaced with at least one of Ca and Sr, and a portion of Ti can be replaced with Zr, and further includes La, Mg, and Mn; and
   when the multilayer body is dissolved by a solvent, and in a case where a total content of Ti and Zr is 100 parts by mole, contents of elements are:
   La: 4-6 parts by mole;
   Mg: 3-5 parts by mole; and
   Mn: 1.5-3 parts by mole.

2. The multilayer ceramic capacitor according to claim 1, wherein, in a case where a content of La is 100 parts by mole, a total content of Ce, Pr, and Nd is less than or equal to 20 parts by mole including 0 part by mole.

3. The multilayer ceramic capacitor according to claim 1, wherein, in a case where a content of La is 100 parts by mole, a total content of Sm, Eu, Gd, Tb, Dy, Y, Ho and Er is less than or equal to 10 parts by mole including 0 part by mole.

4. The multilayer ceramic capacitor according claim 1, wherein in a case where a content of La is 100 parts by mole, a total content of Tm, Yb, and Lu is less than or equal to 5 parts by mole including 0 part by mole.

5. A multilayer ceramic capacitor, comprising:
   a multilayer body including a plurality of laminated dielectric layers and a plurality of internal electrodes arranged along interfaces between the dielectric layers; and
   a plurality of external electrodes located on an outer surface of the multilayer body and electrically connected to the internal electrodes; wherein
   a composition of the dielectric layers includes, as a main component, a perovskite-type compound containing Ba and Ti, where a portion of Ba can be replaced with at least one of Ca and Sr, and a portion of Ti can be replaced with Zr, and further includes La, Mg, and Mn; and
   in a case where a total content of Ti and Zr is 100 parts by mole, contents of elements are:
   La: 4-6 parts by mole;
   Mg: 3-5 parts by mole; and
   Mn: 1.5-3 parts by mole.

6. The multilayer ceramic capacitor according to claim 5, wherein in a case where a content of La is 100 parts by mole, a total content of Ce, Pr, and Nd is less than or equal to 20 parts by mole including 0 part by mole.

7. The multilayer ceramic capacitor according to claim 5, wherein, in a case where a content of La is 100 parts by mole, a composition of the dielectric layer is such that a total content of Sm, Eu, Gd, Tb, Dy, Y, Ho and Er is less than or equal to 10 parts by mole including 0 part by mole.

8. The multilayer ceramic capacitor according to claim 5, wherein, in a case where a content of La is 100 parts by mole, a composition of the dielectric layer is such that a total content of Tm, Yb and Lu is less than or equal to 5 parts by mole including 0 part by mole.

9. A method for manufacturing a multilayer ceramic capacitor, comprising the steps of:
   preparing a main component powder including, as a main component, a perovskite-type compound containing Ba and Ti where a portion of Ba can be replaced with at least one of Ca and Sr, and a portion of Ti can be replaced with Zr;
   preparing an La compound, an Mg compound, and an Mn compound;
   obtaining ceramic slurry after mixing the main component powder, the La compound, Mg compound, and Mn compound;
   obtaining a ceramic green sheet from the ceramic slurry;
   obtaining an unfired multilayer body by laminating the ceramic green sheet and internal electrode layers;
   obtaining the multilayer body having internal electrodes formed between dielectric layer by firing the unfired multilayer body; wherein
   in a case where a total content of Ti and Zr is 100 parts by mole, contents of elements are:
   La: 4-6 parts by mole;
   Mg: 3-5 parts by mole; and
   Mn: 1.5-3 parts by mole.

10. The method for manufacturing a multilayer ceramic capacitor according to claim 9, wherein, in a case where a content of La is 100 parts by mole, a total content of Ce, Pr, and Nd is less than or equal to 20 parts by mole including 0 part by mole.

11. The method for manufacturing a multilayer ceramic capacitor according to claim 9, wherein, in a case where a content of La is 100 parts by mole, a total content of Sm, Eu, Gd, Tb, Dy, Y, Ho and Er is less than or equal to 10 parts by mole including 0 part by mole.

12. The method for manufacturing a multilayer ceramic capacitor according to claim 9, wherein, in a case where a content of La is 100 parts by mole, a total content of Tm, Yb and Lu is less than or equal to 5 parts by mole including 0 part by mole.

13. A method for manufacturing a multilayer ceramic capacitor, comprising the steps of:
   preparing a main component powder including, as a main component, a perovskite-type compound containing Ba and Ti where a portion of Ba can be replaced with at least one of Ca and Sr, and a portion of Ti can be replaced with Zr;
   preparing an La compound, an Mg compound, and an Mn compound;
   obtaining ceramic slurry after mixing the main component powder, the La compound, Mg compound, and Mn compound;
   obtaining a ceramic green sheet from the ceramic slurry;
   obtaining an unfired multilayer body by laminating the ceramic green sheet and internal electrode layers;
   obtaining the multilayer body having internal electrodes formed between dielectric layer by firing the unfired multilayer body; wherein
   when the multilayer body is dissolved by a solvent, in a case where a total content of Ti and Zr is 100 parts by mole, contents of elements are:
   La: 2-6 parts by mole;
   Mg: 3-5 parts by mole; and
   Mn: 1.5-3 parts by mole.

14. The method for manufacturing a multilayer ceramic capacitor according to claim 13, wherein La is 4-6 parts by mole.

15. The method for manufacturing a multilayer ceramic capacitor according to claim 13, wherein, in a case where a content of La is 100 parts by mole, a total content of Ce, Pr, and Nd is less than or equal to 20 parts by mole including 0 part by mole.

16. The method for manufacturing a multilayer ceramic capacitor according to claim 13, wherein, in a case where a content of La is 100 parts by mole, a total content of Sm, Eu, Gd, Tb, Dy, Y, Ho and Er is less than or equal to 10 parts by mole including 0 part by mole.

17. The method for manufacturing a multilayer ceramic capacitor according to claim 13, wherein, in a case where a content of La is 100 parts by mole, a total content of Tm, Yb and Lu is less than or equal to 5 parts by mole including 0 part by mole.

* * * * *